April 3, 1951 F. J. HAUSCHILD 2,547,391
FLANGE PLOW
Filed July 1, 1946
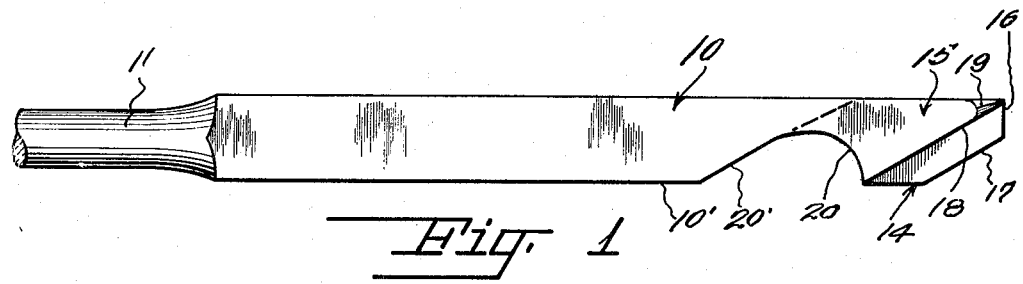
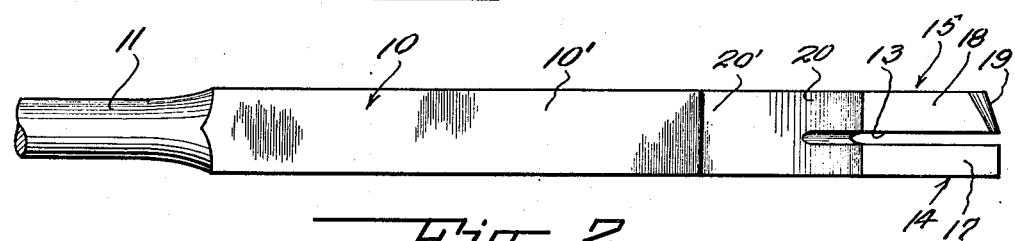
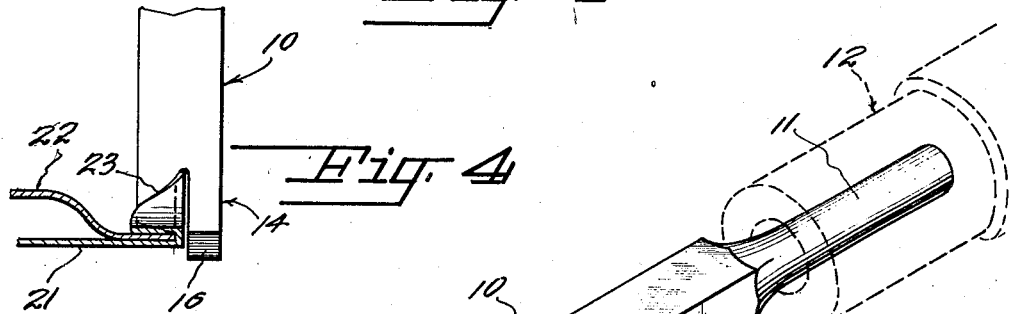
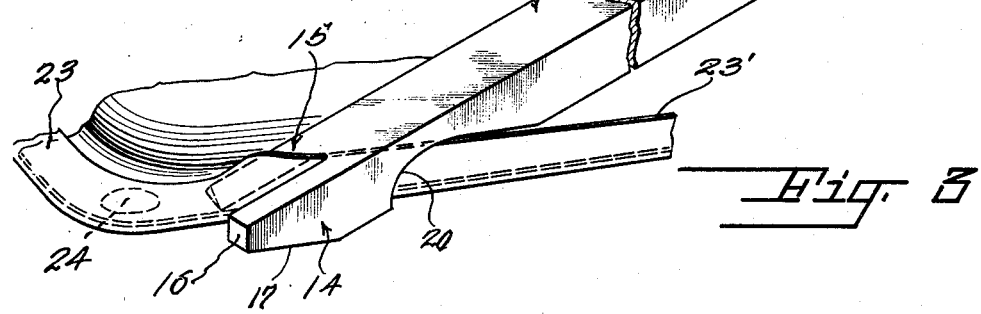
INVENTOR.
Frederick J. Hauschild
BY
Wilfred E. Lawson
Attorney Patented Apr. 3, 1951

2,547,391

UNITED STATES PATENT OFFICE 2,547,391

FLANGE PLOW

Frederick J. Hauschild, Oneonta, N. Y.

Application July 1, 1946, Serial No. 680,627

3 Claims. (Cl. 7—1)

This invention relates generally to the class of tools and pertains particularly to improvements in tools designed for use in connection with the repairing of motor vehicle bodies.

In motor vehicle body repair work it is frequently necessary to raise flanged portions of metal which have been turned over and pressed down flat and welded against an adjacent metal body, in order to get to certain parts which require straightening or repair. For example, in making repairs upon a vehicle trunk cover, it is frequently necessary to raise a surrounding flange away from a stiffening or reinforcing sheet body disposed upon the inner side of the cover panel, which flange after being turned down is spot welded to the adjacent panel and stiffening or reinforcing body. This job is very slow and time consuming.

A principal object of the present invention is to provide a plow tool by means of which the flange can be readily separated at the weld point from the adjacent body and turned up into a position at right angles to the body of which it forms a part, such tool being particularly designed to be coupled with a suitable hammering or driving tool, such, for example, as the pneumatic hammer disclosed in my Patents Number 2,148,619 and 2,148,943 both issued February 28, 1939.

Another object of the invention is to provide a tool of the character stated, which in addition to engaging and raising a metal flange is provided with a chisel edge which is adapted to move along under the flange and cut away the metal at those points or spots where a weld has been made.

The invention more specifically comprises a relatively long tool body having a driving shank at one end and longitudinally split at its other end to provide two space parallel members between which the flange is guided, one of the members being of slightly greater length and width than the other and functioning as an outside guide against one face of which the flange is turned up, the other member being sharpened to provide a chisel which moves along under the flange and cuts away the weld spots.

The invention will be best understood from a consideration of the following detailed description taken in connection with the accompanying drawing forming a part of the specification with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view in elevation of the innerside of a tool constructed in accordance with the present invention.

Figure 2 is a view in plan of the underside of the tool.

Figure 3 is a view in perspective illustrating the manner of using the tool and showing a portion of an edge of a motor vehicle trunk cover and illustrating the application of a pneumatic hammer to the tool.

Figure 4 is a view looking toward the advancing end of the tool, the lower end portion only being shown, showing the manner in which the chisel member engages beneath the flange.

Referring now more particularly to the drawing the numeral 10 generally designates the body of the tool which, as shown, is a relatively long member and is preferably substantially square in cross section through the major portion of its length.

At the rear or driving end, the body 10 is drawn off to form a circular shank 11 to the end of which driving blows may be applied by the use of any suitable tool. This shank portion 11 is designed particularly to be coupled with a pneumatic hammer, a portion which is shown in broken lines and generally designated 12, such, for example, as the hammer shown in my prior patents hereinbefore referred to.

At its forward end the body 10 is provided with the central longitudinally extended slot 13 whereby such forward end portion is divided into two spaced parallel fingers 14 and 15.

The finger 14 may be referred to or defined as the outside finger and this finger is flat or cut square across at its forward end as indicated at 16 and has the forwardly directed, oblique under face 17.

The inner finger 15 likewise has an oblique forwardly directed under face 18 which is parallel with the face 17 but set rearwardly therefrom as clearly shown in Figure 1. The under face 18 of the finger 15 cuts through the top side of the body in the plane of the forward end 16 of the finger 14 and the edge so formed by the merging of the top surface of the body finger 15 and face 18 is ground down to form the cutting edge or chisel 19 which slants rearwardly from the inner side of the finger 15 to the outer side thereof as best seen in Figure 2.

The under face of the body 10, which is designated 10', has formed therein the relatively deep recess 20 which extends entirely across the width of the body and which starts at the transverse line where the lower end of the oblique face 18 of the chisel finger 15 cuts into the plane of the under face 10' and extends upwardly and rearwardly in an arc as shown in Figure 1, until it merges with the rear part of the slot 13, whereupon such recess is directed along a straight line oblique to the length of the body and in a plane passing through the under face 10' of the body as illustrated. This straight line portion of the recess 20, which is designated 20', is in line with the inner end of the slot 13, which inner end of the slot is oblique to the length of the body 10 as shown in Figure 1.

The numeral 21 designates a portion of the outer panel of a motor vehicle trunk cover while the numeral 22 designates a portion of the inner panel of the same. Such panels are joined together through the provision of a flange 23 which is turned from the outer panel 21, in over the edge of the inner panel and mashed down flat as shown in Figure 4 and then spot welded at intervals as indicated at 24 in Figure 3.

In the use of the present tool the cutting edge 19 of the chisel finger 15, is started under the flange 23 with the oblique under face 18 thereof directed downwardly and resting upon the top of the inner panel 23. The outer guide finger 14 is disposed across the outer edge of the trunk cover as shown in Figure 4 and the body of the tool is disposed at the most convenient inclination, which will be automatically assumed by the tool through the flat engagement of the face 18 upon the surface of the inner panel. By the application of driving blows to the end of the shank 11, by the use of an air hammer or any other suitable implement, the flange plow will be driven forwardly so that the cutting edge of the chisel finger 15 will plow under the flange 23 causing the flange to enter the slot 13 and thus be forcibly bent upwardly to a vertical position, as indicated at 23' in Figure 4. The recess 20 allows for the lateral shifting or swinging of the rear end portion of the tool so that it is possible to move the tool around corners without interrupting the operation of cutting the weld spots and bending the flange upwardly.

From the foregoing it will readily be seen that there is provided in the present invention a novel and efficient tool by means of which flanges of the character stated may be easily and quickly bent or straightened up so that repair jobs, particularly upon trunk covers, may be easily and quickly completed.

In automobile body top repair shops the job of repairing trunk covers is one which requires an unusual amount of work. Such jobs frequently require as much as 10 hours to accomplish whereas with a tool of the character herein described repair jobs upon trunk covers can be completed in as little as one and a half hours.

I claim:

1. A flange raising tool of the character stated, comprising a relatively long body, a relatively long narrow slot formed in and extending longitudinally of one end of the body forming two spaced parallel fingers between which a raised flange is received, the free end of one of such fingers being tapered to provide a chisel edge, the body having a recess adjacent to and merging with the slot at the rear underface of the chisel finger to receive the flange, and the other end of the body being designed to receive hammer blows.

2. A flange raising tool of the character stated, comprising a relatively long body, a pair of spaced parallel fingers integral with and extending longitudinally of one end of the body, said fingers having adjacent parallel flat faces between which a raised flange is received, the fingers terminating at their free ends substantially in the same plane transversely of the body, the said free ends of the fingers forming the forward end of the tool, each of said fingers being tapered and having a flat face extending obliquely to the axially transverse plane of the body, the plane of the said face of one finger being set rearwardly with respect to the plane of the said face of the other finger, and that finger having said rearwardly set face having its free end formed to provide a chisel edge, the body having a relatively deep recess cut therein across the width of the body immediately adjacent to and merging with the rear end of the oblique face of the chisel finger, the recess having a sufficient depth to receive the raised flange.

3. A flange raising tool of the character stated, comprising a relatively long body having top, bottom and side faces, the body at one end having a relatively wide and long slot cut therein to and extending longitudinally thereof to form two spaced parallel fingers between which a raised flange is received, the free ends of the fingers constituting the forward end of the tool, one of such fingers having a forwardly directed under face, the other finger having a forwardly directed under face which is parallel with the first mentioned under face but set rearwardly therefrom, the said finger faces being oblique to the axially transverse plane of the body, the oblique under face of the said other finger cutting through the top surface of the body and providing a sharp chisel edge, the said bottom face of the body having a relatively deep recess cut transversely thereacross through the body side faces, the rear end of the second mentioned oblique face merging with the forward side of the recess and said slot opening at its rearward end into the recess, said recess being of a depth to receive the flange when raised by the fingers.

FREDERICK J. HAUSCHILD.

REFERENCES CITED

The following references are of record in the file of this patent:

UNITED STATES PATENTS

| Number | Name | Date |
|---|---|---|
| 620,426 | Danzer | Feb. 28, 1899 |
| 1,471,062 | Riblett | Oct. 16, 1923 |
| 2,176,626 | Gentry | Oct. 17, 1939 |
| 2,203,158 | Klein | June 4, 1940 |
| 2,250,848 | Williams | July 29, 1941 |
| 2,392,495 | Nameth | Jan. 8, 1946 |